United States Patent Office 3,637,612
Patented Jan. 25, 1972

3,637,612
FAST CURING OF POLYSULFIDE POLYMERS
Eugene R. Bertozzi, Yardley, Pa., assignor to Thiokol Chemical Corporation, Bristol, Pa.
No Drawing. Filed Jan. 27, 1970, Ser. No. 6,329
Int. Cl. C08g 23/00
U.S. Cl. 260—79    5 Claims

ABSTRACT OF THE DISCLOSURE

A process is disclosed for achieving an exceptionally fast room temperature cure of liquid polythiopolymercaptan polymers by using as a curing agent either the combination of an aqueous weak acid and a zinc compound selected from the oxide, peroxide, hydroxide and carbonate or an aqueous zinc salt of a weak acid.

---

The present application relates generally to the manufacture of rubber-like polysulfide polymers. More particularly, the invention relates to a novel method of effecting exceptionally rapid room temperature cures of liquid polysulfide polymers to produce hard rubber-like products.

Polysulfide rubbers have long been known in the art and are known to have certain outstanding properties such as excellent resistance to a wide range of solvents, good resistance to atmospheric oxidation and weathering, adherence to metals, and retention of their elastic properties over a relatively wide temperature range. They were initially produced as solid polymers. At a later date methods were developed as disclosed, for example, in U.S. Pat. No. 2,466,963, for splitting the solid polymers to form liquid polythiopolymercaptan polymers that are curable to form rubber-like materials having the desirable properties described above. The liquid polymers are particularly useful in a wide variety of applications because of the ease of handling a liquid material and of forming it to a desired configuration in which it can be cured to a rubbery product.

As disclosed in U.S. Pat. 2,466,963, the polysulfide polymers are characterized by the fact that the molecules of both the solid and liquid polymers contain the recurring unit (RSS) in which R represents the same or different divalent organic radicals that can vary widely in their specific structure, but are typically alkylene or oxahydrocarbon radicals interconnected by disulfide groups. While a wide variety of such polymers can be prepared, the polymers that are presently of commercial importance fall within a somewhat more limited group. Several of the commercially important liquid polymers are particularly described in articles by Fettes and Jorczak, published in "Industrial and Engineering Chemistry," vol. 42, page 2217 (1950) and vol. 43, page 324 (1951). As pointed out in these articles, the commercially available liquid polymers, e.g., the LP-2 polymer described therein, are generally prepared from bis-beta-chloroethylformal and are essentially composed of recurring

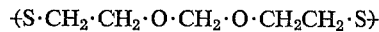

groups and have free mercapto terminals through which they may be cured to form a solid elastomer. In the manufacture of these commercial polymers a small percentage of trichloropropane is commonly mixed with the formal to provide a certain amount, say 0.1 to 4%, of cross-linking. Their molecular weights may vary from 500 to 10,000 and their viscosities from 300 to 100,000 centipoises at 25° C.

While a large number of curing agents and curing procdeures have been previously proposed for curing polysulfide polymers, there are still certain applications for which the known cures are not completely satisfactory. Thus many of the proposed curing procedures require the application of external heat; the number of room temperature curing techniques is relatively limited. Also the previously proposed room temperature cures are, in general, relatively slow cures.

In the mass production of shaped articles, e.g., children's toys, it is desirable that a curing procedure be available that is capable of curing the liquid polymer very rapidly to a hard elastomer. Also for such applications it is often important that the cure be effected with non-toxic materials. So far as I am aware, no previously proposed curing technique is completely satisfactory for such applications.

It is accordingly an object of the present invention to provide a method of curing liquid polythiopolymercaptan polymers that effects an execptionally rapid conversion of the liquid polymer to a hard rubber-like product. It is another object of the invention to effect such a cure with non-toxic materials. It is a further object of the invention to achieve a high hardness cure in a composition containing little or no filler materials. Other objects of the invention will be in part obvious and in part pointed out hereafter.

The present invention is based on the discovery that the foregoing objects can be achieved by using as a curing agent either a combination of aqueous weak acid and a zinc compound selected from the oxide, peroxide, hydroxide and carbonate, or alternatively an aqueous zinc salt of a weak acid. It appears that the anion of the weak acid acts as an activating agent to activate the curing action of the zinc compound. ince it has been generally thought that acidic curing systems do not produce satisfactory high hardness cures, the present finding is a surprising and unexpected result.

In carrying out the first embodiment of the process of the invention the zinc compound is thoroughly dispersed in the liquid polymer and the aqueous acid is then added rapidly with vigorous agitation. Curing begins almost immediately and in the course of 15 to 30 seconds the composition stiffens to the point where it is only difficultly deformable. At the end of 5 minutes the cure is substantially complete and a hard elastomer is obtained.

The quantity of zinc compound used may be varied over a relatively wide range depending upon the properties desired in the cured product. In most cases it is desirable to use from about 5 to 50 parts by weight per 100 parts of liquid polymer. Representative weak acids include formic, acetic and benzoic acids. The concentration of the aqueous acid solution (or slurry in the case of benzoic acid) is not critical and may vary from as little as 5% to 60% or more. The quantity of aqueous acid added is desirably such as to provide from 1 to 10 parts by weight of acid per 100 parts of polymer in the mixture.

In cases where an aqueous zinc salt of a weak acid is used as a curing agent instead of the combination of zinc compound and weak acid, it has been found that the cure is somewhat slower, e.g., several minutes rather than 15 to 30 seconds. The aqueous zinc salt is preferably used in an amount of 10 to 60 parts by weight of zinc salt per 100 parts by weight of polymer.

The compositions of the invention may, if desired, contain various adjuvants previously used in polysulfide polymer compositions such as fillers, pigments, adhesion-promoting agents and the like.

In order to point out more fully the nature of the present invention, the following examples are given of illustrative procedures for carrying out the process of the invention.

EXAMPLE 1

To 100 parts by weight of LP-2 liquid polythiopolymercaptan polymer there were added 30 parts of zinc oxide and 10 parts of 50% aqueous acetic acid. The components were thoroughly and rapidly mixed and curing of the polymer started immediately. At the end of 15 seconds it was barely possible to form the mixture manually into a ball. At the end of five minutes the cure had proceeded to such an extent that the ball was hard and elastomeric as evidenced by the fact that it was very bouncy. Its Shore A hardness was measured and found to be 80. When heated in an oven at 212° F. for 24 hours, it did not soften but became slightly puffy, presumably because of the evaporation of entrapped moisture. The cured product was very tough.

The foregoing procedure was repeated using zinc hydroxide and zinc peroxide in place of zinc oxide and similar results were obtained.

EXAMPLE 2

100 parts by weight of LP-2 polymer were thoroughly and rapidly mixed with 40 parts of aqueous zinc acetate. Curing proceeded somewhat more slowly than in Example 1. More particularly, it took about 5 minutes for the mixture to reach the difficultly moldable consistency that the mixture of Example 1 attained in 15 seconds. The properties of the cured product were generally similar to those of the product of Example 1.

EXAMPLE 3

50 grams of LP-2 polymer was thoroughly and rapidly mixed with 15 grams of zinc oxide and 10 cc. of 50% formic acid. The mixture cured in two minutes to a tough rubbery solid.

EXAMPLE 4

50 grams of LP-2 polymer was thoroughly and rapidly mixed with 15 grams of zinc carbonate and 10 cc. of 10% aqueous acetic acid. The mixture cured to a tough rubbery solid in 5 minutes.

From the above description and examples it should be apparent that the process of the invention provides an exceptionally rapid cure of liquid polythiopolymercaptan polymers to tough, hard, rubbery products having good thermal stability. It is of course to be understood that the foregoing examples are intended to be illustrative only and that numerous changes can be made in the materials and properties set forth therein without departing from the spirit of the invention as defined in the appended claims.

I claim:

1. The method of rapidly curing a liquid, mercapto-terminated polysulfide polymer having alkylene or oxahydrocarbon groups interconnected by disulfide groups to a relatively hard rubber which consists essentially in incorporating in said polymer as essentially the sole curing agent an aqueous acidic curing system selected from (1) an aqueous zinc salt of acetic, formic or benzoic acid in an amount of 10 to 60 parts by weight of zinc salt per 100 parts of polymer and (2) the combination of aqueous acetic, formic or benzoic acid with zinc hydroxide, carbonate, oxide or peroxide, said acid being used in an amount of 1 to 10 parts by weight of acid per 100 parts of polymer and said zinc compound being used in an amount of about 5 to 50 parts by weight per 100 parts of polymer, and causing said curing agent to react with said polymer without the application of external heat to convert it to rubbery form.

2. The method of rapidly curing a liquid, mercapto-terminated polysulfide polymer having alkylene or oxahydrocarbon groups interconnected by disulfide groups to a relatively hard rubber which consists essentially in incorporating in said polymer as essentially the sole curing agent an aqueous acidic curing system which is an aqueous zinc salt of acetic, formic or benzoic acid in an amount of 10 to 60 parts by weight of zinc salt per 100 parts of polymer, and causing said curing agent to react with said polymer without the application of external heat to convert it to a rubbery form.

3. The method of rapidly curing a liquid, mercapto-terminated polysulfide polymer having alkylene or oxahydrocarbon groups interconnected by disulfide groups to a relatively hard rubber which consists essentially in incorporating in said polymer as essentially the sole curing agent an aqueous acidic curing system which is a combination of aqueous acetic, formic or benzoic acid with zinc hydroxide, carbonate, oxide or peroxide, said acid being used in an amount of 1 to 10 parts by weight of acid per 100 parts of polymer and said zinc compound being used in an amount of about 5 to 50 parts by weight per 100 parts of polymer, and causing said curing agent to react with said polymer without the application of external heat to convert it to a rubbery form.

4. A method according to claim 3 in which the zinc compound is zinc oxide and the acid is 50% aqueous acetic acid.

5. A method according to claim 3 in which the acid concentration in the aqueous acid is from 5% to 60% by weight.

References Cited

UNITED STATES PATENTS

| | | | |
|---|---|---|---|
| 2,466,963 | 4/1949 | Patrick et al. | 260—79.1 |
| 3,219,638 | 11/1965 | Warner | 260—79 |
| 3,349,047 | 10/1967 | Sheard | 260—18 |
| 3,423,374 | 1/1969 | Jones et al. | 260—79 |
| Re. 19,207 | 6/1934 | Jones et al. | 260—79 |
| 2,026,875 | 1/1936 | Ellis et al. | 106—22 |
| 2,195,380 | 3/1940 | Patrick | 260—79 |
| 3,352,812 | 11/1967 | Parham, Jr. | 260—31.8 |

FOREIGN PATENTS

| | | | |
|---|---|---|---|
| 1,800,982 | 5/1969 | Germany | 260—79 |

OTHER REFERENCES

Handbook of Chemistry and Physics, The Chemical Rubber Co., 1969–1970 Edition, p. D118.

Fettes et al., Polysulfide Rubbers, pp. 2217–2223, (Reprint, Industrial and Enginering Chemistry, vol. 42, p. 2217, November 1950).

Remy, Treatise on Inorganic Chemistry, vol. II, p. 443, (1956), Elsevier Publ. Co., N.Y.

DONALD E. CZAJA, Primary Examiner

M. I. MARQUIS, Assistant Examiner

U.S. Cl. X.R.

260—18 R, 29.2 R, 37 R, 79.1 R